UNITED STATES PATENT OFFICE.

YOUSOUFF BEY, OF NEW YORK, N. Y.

IMPROVED COMPOSITION FOR COVERING AND PROTECTING IRON.

Specification forming part of Letters Patent No. 38,022, dated March 31, 1863.

*To all whom it may concern:*

Be it known that I, YOUSOUFF BEY, of the city, county, and State of New York, have invented or discovered a new and useful Compound or Paint for Protecting Iron from Corrosion, and particularly applicable to the painting or coating of ships' bottoms or the iron plating of vessels; and I do hereby declare the following to be a full, clear, and exact description of the manner of making and compounding the same and of the manner of applying it to use.

I use the following ingredients and proportions thereof, only varying the same to change the consistency of the compound as occasion may require, viz: rosin or rosin and gum-copal, from forty to seventy pounds; tallow, from twenty to fifty pounds; beeswax, five pounds; oxide of iron, five pounds. When rosin alone is used I take from forty to seventy pounds, and when rosin and gum-copal are both used I take about twenty pounds of the former and about fifty pounds of the latter, and mix with the lowest quantity of tallow (twenty pounds) and the above-named quantities of beeswax and metallic oxide.

The compound is mixed as follows: The rosin is melted over a very slow fire, taking care that it is not allowed to bubble. The tallow, in which the oxide of iron has been previously well mixed, is then added, and lastly the beeswax. The mixture should at no time attain a boiling-point, and should be continually well stirred until it becomes comparatively stiff by cooling to prevent a separation of the parts. To manufacture the hardest composition of this kind I use the gum-copal with the rosin and mix as follows: The gum-copal is first melted and removed from the fire. The tallow, with the oxide of iron mixed with it, as above stated, is then added, and when thoroughly mixed add the rosin and then the beeswax and stir well until it has set or cooled.

The compound can be applied in a more or less fluid or solid state as follows: If in a fluid state, like any ordinary paint, then spirits of turpentine may be added to the compound when melted by heat to prevent its hard setting when cold; but if applied in a more solid state the compound and the metal on which it is to be applied, one or both, should be heated to from 100° to 180° of Fahrenheit's scale, according to its hardness.

In its thin or fluid state this compound may be applied by a brush to the surface of any cast or wrought iron that is to be coated to protect it from corrosion. In its semi-hard or elastic state it may be applied between plates of iron and the bolt-holes and bolts thereof to pack the joints and make them impervious to air or water, and thus protect them from corrosion.

Though I speak of the use of gum-copal and of spirits of turpentine with this compound, I wish to be understood as mentioning these articles as a means of hardening or rendering fluid the compound itself, depending upon the special application to be made of it and whether it is to set hard or remain in an elastic or undried condition.

If desirable to give the compound a particular shade or color, it can be done by mixing the coloring-matter therewith.

Having thus fully described my invention or discovery, what I claim is—

A compound for protecting iron from corrosion, composed of the ingredients above named and in the proportions substantially as above described.

YOUSOUFF BEY.

Witnesses:
 A. B. STOUGHTON,
 EDM. F. BROWN.